(12) United States Patent
Ripy et al.

(10) Patent No.: US 7,065,593 B2
(45) Date of Patent: Jun. 20, 2006

(54) CENTRALIZED, DOUBLE BANDWIDTH, DIRECTIONAL, SHARED BUS COMMUNICATION SYSTEM ARCHITECTURE

(75) Inventors: Paul Brian Ripy, Guerneville, CA (US); Paul Edwin O'Connor, Grass Valley, CA (US); Amar Mohammed Othman, Santa Rosa, CA (US)

(73) Assignee: Tellabs Petaluma, Inc., Petaluma, CA (US)

( * ) Notice: Subject to any disclaimer, the term of this patent is extended or adjusted under 35 U.S.C. 154(b) by 389 days.

(21) Appl. No.: 10/738,283

(22) Filed: Dec. 17, 2003

(65) Prior Publication Data
US 2006/0034320 A1    Feb. 16, 2006

(51) Int. Cl.
*G03F 1/12* (2006.01)
*G06F 1/12* (2006.01)

(52) U.S. Cl. .................. 710/100; 713/500; 326/86; 361/1; 370/464

(58) Field of Classification Search ........ 710/305–306, 710/316–317; 713/500–502; 326/30, 86; 361/1–3; 370/464
See application file for complete search history.

(56) References Cited

U.S. PATENT DOCUMENTS

| | | | | |
|---|---|---|---|---|
| 4,064,486 A * | 12/1977 | Faber | ................. | 370/476 |
| 5,311,508 A * | 5/1994 | Buda et al. | ................. | 370/476 |
| 5,444,847 A * | 8/1995 | Iitsuka | ................. | 710/107 |
| 5,600,803 A * | 2/1997 | Iitsuka et al. | ................. | 709/208 |
| 5,781,745 A | 7/1998 | Ramelson et al. | ................. | 395/293 |
| 5,809,258 A | 9/1998 | Bemanian et al. | ................. | 395/287 |
| 5,857,087 A | 1/1999 | Bemanian et al. | ................. | 395/309 |
| 5,978,937 A * | 11/1999 | Miyamori et al. | ................. | 714/45 |
| 6,029,208 A * | 2/2000 | Kim | ................. | 710/4 |
| 6,269,081 B1 | 7/2001 | Chow et al. | ................. | 370/241 |
| 6,883,047 B1 * | 4/2005 | Warren et al. | ................. | 710/67 |
| 6,966,009 B1 * | 11/2005 | Boduch | ................. | 713/500 |

* cited by examiner

*Primary Examiner*—Christopher Shin
(74) *Attorney, Agent, or Firm*—Mark C. Pickering

(57) ABSTRACT

A low-cost, high-speed, bus-based communication system is provided that includes a master electronics card, a number of slave electronics cards, and a backplane that interconnects the master and the slave electronics cards via a serial bus, a parallel bus and some common signals for clocking and synchronization.

20 Claims, 8 Drawing Sheets

CENTRALIZED, DOUBLE BANDWIDTH, DIRECTIONAL, SHARED BUS COMMUNICATION SYSTEM ARCHITECTURE

BACKGROUND OF THE INVENTION

1. Field of the Invention

The present invention relates to a backplane-based communications system and, more particularly, to a high-speed, open collector, shared backplane-based communications system with increased noise immunity when the backplane is lightly-loaded.

2. Description of the Related Art

A backplane-based communications system is a system that electrically connects together a number of electronics cards, such as XDSL line cards, via a multi-drop transmission line (MDTL) that runs through the backplane. Each of the electronics cards includes transceivers that receive information from, and transmit information to, the MDTL in accordance with the rules defined by a communications protocol.

One common communications protocol is the asynchronous transfer mode (ATM) protocol. The ATM protocol defines the rules for transferring data across a network in 53-byte cells that include a 48-byte data field and a 5-byte header. Another communications protocol is the synchronous optical network (SONET) protocol. The SONET protocol defines the rules for outputting serial data streams of various rates, such as 155.52 Mbps.

FIG. 1A shows a perspective view that illustrates a prior-art, backplane-based communications system 100. FIG. 1B shows a schematic diagram that illustrates a portion of communications system 100. As shown in FIGS. 1A–1B, communications system 100 includes a backplane 110, and a number of electronics cards 112 that are plugged into backplane 110. In the FIG. 1A example, two electronics cards 112 are plugged into backplane 110, one at each end, while in the FIG. 1B example, 16 electronics cards 112 are plugged into backplane 110, filling backplane 110.

Backplane 110 has a first MDTL 114 that represents a first number of metal lines, and a second MDTL 116 (not shown in FIG. 1B) that represents a second number of metal lines. First MDTL 114 can include, for example, 16 metal lines (dual byte wide), while second MDTL 116 can include, for example, 34 metal lines.

In addition, backplane 110 has a number of connecters 118 that are connected to the first and second MDTLs 114 and 116. The connectors 118 are uniformly distributed along the length of the first and second MDTLs 114 and 116 to have, for example, a 2.54 cm (one inch) spacing.

As further shown in FIG. 1, each electronics card 112 has a receiver 120 and a transmitter 122 that is electrically connected to first MDTL 114. Receiver 120 receives ATM data from, and transmitter 122 transmits ATM data to, first MDTL 114 utilizing, for example, backplane transceiver logic (BTL). The BTL can run at, for example, 30 MHz, or 33.3 nS/word, yielding 480 Mbps of ATM traffic bandwidth (1(33.3 nS/16 bits per word)).

Optionally, each electronics card 112 could include a transceiver 124 (not shown in FIG. 1B) that is electrically connected to second MDTL 116. Transceiver 124 could receive SONET-framed serial data from, and transmit SONET-framed serial data to, second MDTL 116 utilizing, for example, 32 traces for data and 2 traces for control signals, yielding 4.976 Gbps (155.52 Mbps per trace*32 traces). As a result, communications system 100 optionally provides two backplane buses: an ATM-based bus and a SONET-based bus.

One drawback of communications system 100 is that the cost of terminating high-speed serial SONET streams at 155 Mbps on individual electronics cards, such as cards 112, is very high. As a result, there is a need for a communications system that provides a data rate of approximately 150–155 Mbps across a backplane bus that is less expensive than terminating a SONET stream on an individual electronics card.

Another drawback of communications system 100 is that first and second MDTLs 114 and 116 have impedance mismatches that vary with the load (the number of electronics cards 112 that are connected to the first and second MDTLs 114 and 116). As described below, the impedance mismatches lead to standing waves that may limit the maximum operating frequency fop when an MDTL is lightly-loaded.

An inherit property of MDTLs is an intentional mismatch between the characteristic impedance Zo of the transmission line, which varies as a function of the load, and the impedance of the terminating network Zt. The impedance mismatch is designed such that, under full loading (where an electronics card 112 is plugged into each connector 118), the transmission line characteristic impedance Zo matches the network impedance Zt (i.e., there is no impedance mismatch when an electronics card 112 is plugged into each connector 118).

However, under light loading (where a number of the connectors 118 are empty), impedance mismatch causes reflection waveforms that form an interference pattern. Under certain circumstance, interference patterns form a phenomenon known as standing waves which, in turn, cause severe attenuations of the incident waveforms.

The severity of the attenuation is proportional to the magnitude of the mismatch between the transmission line and network impedances Zo and Zt. If the attenuation is severe enough, the result is communication system failure. As a result, the conductors have to be properly terminated to preserve signal integrity.

To illustrate the variation of the transmission line characteristic impedance Zo as a function of the load, consider the case of a lightly-loaded, lossless MDTL that has only two electronics cards attached to it, one card at each end of the MDTL, such as shown in FIG. 1A. In this case, the MDTL is a point-to-point transmission line. For a point-to-point transmission line, the transmission line characteristic impedance Zo is defined by equation EQ. 1 as:

$$Z_O = \sqrt{\frac{L}{C}}, \qquad \text{EQ. 1}$$

while the propagation delay τpd is defined by equation EQ. 2 as:

$$\tau pd = \sqrt{LC} \qquad \text{EQ. 2}$$

where L and C are the line inductance and capacitance per unit length, respectively. In addition, the transmission line characteristic impedance Zo is real (i.e. behaves like a resister) and is only a function of the transmission line geometry. Hence, a lossless transmission line is completely specified by its characteristic impedance Zo and propagation delay τpd.

Now consider the case where all the loads are attached to the MDTL. The loads introduce a distributed capacitive loading per unit length Cd. Thus, the MDTL has a new value for both characteristic impedance Zo' and propagation delay τpd'. These new values are calculated according to equations EQs. 3, 4, and 5 as:

$$Zo' = \sqrt{\frac{L}{C+Cd}}, \quad \text{EQ. 3}$$

$$\tau pd' = \sqrt{L(C+Cd)}, \text{ and} \quad \text{EQ. 4}$$

$$Cd = \frac{NCl}{H} \quad \text{EQ. 5}$$

where Cl is the load capacitance, N is number of loads, and H is the length of the transmission line. Hence, as loads are added to a lightly-loaded transmission line, the transmission line impedance Zo' reduces and the propagation delay τpd' increases.

For example, assume that an MDTL has 16 loads that are each uniformly spaced 2.54 cm (one inch) apart. The loads are represented by their total capacitance Cl (i.e. IC I/O pin, vias, connecters, and wires capacitance). A reasonable estimation of Cl for a typical high-speed, open collector based MDTL is 12 pf. Furthermore, assume that the MDTL is an FR4 stripline with a transmission line impedance Zo=60 Ω.

The capacitance C and inductance L can be calculated from EQs. 1 and 2 as shown in EQs. 6 and 7 as:

$$C = \frac{\tau pd}{Zo}, \text{ and} \quad \text{EQ. 6}$$

$$L = Zo^2 C. \quad \text{EQ. 7}$$

As a result, C=3 pf and L=10.8 nH. Next, Cd is calculated from equation 5 which gives us Cd=12 pf. Then, from equations EQs. 3 and 4:

$$Zo' = \sqrt{\frac{10.8e^{-9}}{(3e^{-12}+12e^{-12})}} \approx 27\Omega, \text{ and}$$

$$\tau pd' = \sqrt{10.8e^{-9}(3e^{-12}+12e^{-12})} \approx 400 \text{ ps}.$$

From the above, under a full load, the transmission line characteristic impedance Zo drops from 60 Ω to 27 Ω and τpd slows down from 180 ps/in to 400 ps/in.

The termination impedance Zt must then be set to 27 Ω to match the transmission line characteristic impedance Zo' under a full load. As a consequence, at light loading, the network termination impedance Zt is mismatched with the transmission line characteristic impedance Zo and reflections are present in the transmission line.

The impedance mismatches lead to reflections which lead to standing waves which, in turn, limit the maximum operating frequency fop when the MDTL is lightly-loaded. There are many factors that limit how fast a MDTL may operate (i.e. maximum fop). Some factors include IC propagation delay, time of flight, clock to data skew, and setup and hold times.

Standing waves become an issue in long MDTLs that contain sizable reflections compared to the amplitude of the incident wave. To avoid standing-wave problems in an MDTL, the length of the MDTL should be comfortably shorter than one-fourth the wavelength (λ/4) of the operating frequency fop. If the above condition is not satisfied, then the maximum incident wave attenuation must be evaluated to ensure that is acceptable.

For example, a typical 48.26 cm (nineteen inch) telecommunication equipment rack has a usable backplane (MDTL) length of about 43.1 cm (17 inches). In addition, assume a propagation delay τpd of 180 pS/2.54 cm (180 pS/inch). The frequency fq at which 43.1 cm (17 inches) (the length of the MDTL) matches (λ/4) is found using equation EQ. 8:

$$fq = \frac{1}{4\tau pd(Ltl)} \quad \text{EQ. 8}$$

where Ltl is the length of the MDTL. Substituting in the values of the example produces:

$$fq = \frac{1}{4(180e^{-12})(17)} \approx 81.7 \text{ MHz}.$$

Thus, when lightly loaded, the MDTL of the present example has a maximum operating frequency fop of approximately 82 MHz. If the maximum operating frequency fop of communications system 100 is substantially less than fq, such as 30 MHz, then standing waves present little problem. On the other hand, if the maximum operating frequency fop is equal to fq, then communications system 100 has reduced noise immunity, and may not be suitable for many applications.

To perform a simulation of an MDTL to evaluate the noise immunity at 82 MHz, assume a backplane length of about 43.1 cm (17 inches), 2 loads, a transmission line characteristic impedance Zo of 60 Ω, a transmission line characteristic impedance Zo' of 27 Ω, a propagation delay τpd of 180 pS/2.54 cm (180 pS/inch), a propagation delay τpd' of 400 pS/2.54 cm (400 pS/inch), a termination line impedance Zt of 27 Ω, and a source impedance Zs of 27 Ω.

Further assume that the drivers that are connected to the MDTL are open collectors, which require a pull-up resister to a 2.1 v termination voltage. Thus, when all the drivers are off, the steady state voltage on the MDTL is 2.1 v. On the other hand, when one of the drivers turns on, the steady state voltage is 1 v.

Thus, the waveform has an amplitude swing of 1.1 v, a minimum input high threshold Vih=1.62 v, and a maximum input low thresh hold Vil=1.47 v. (These values are typical of transceiver model number FB1653 manufactured by Texas Instruments.) As a result, there is not much room for noise in this system.

In addition, to perform the simulation, the magnitude ρl of the waveform after first being reflected back from the receiver (the load reflection coefficient of the MDTL), and the magnitude ρs of the waveform after first being reflected back from the driver ρs (one round trip after first being driven) (the source reflection coefficient) of the MDTL are calculated. When the driver turns off (i.e., the wave transitions from low to high), the magnitude of the reflected wave at the receiver ρl and ρs are:

$$\rho l = \frac{Zl - Zo}{Zl + Zo} = \frac{27 - 60}{27 + 60} \approx -0.38, \text{ and}$$

$$\rho s = \frac{Zs - Zo}{Zs + Zo} = \frac{27 - 60}{27 + 60} \approx -0.38,$$

where the product of ρlρs=0.144. This product means that the reflections from the low to high transitions attenuate rapidly. Further, the initial wave is also attenuated by the voltage divider of the source impedance of the driver Zs and the transmission line characteristic impedance Zo.

When the driver turns on (i.e., the wave transitions from high to low), the low impedance of the driver is now engaged and ρl and ρs become:

$$\rho l = \frac{Zl - Zo}{Zl + Zo} = \frac{27 - 60}{27 + 60} \approx -0.38, \text{ and}$$

$$\rho s = \frac{Zs - Zo}{Zs + Zo} = \frac{0 - 60}{0 + 60} \approx -1.0.$$

The product of ρlρs=0.38. Thus, the reflections from the high to low transition are larger due to the low impedance of the driver.

FIG. 1C shows an Hspice simulation of communications system 100 that illustrates the waveform along the length of MDTL 114. The simulation is based on the above assumptions and calculations using an operating frequency fop=82 MHz. As shown in FIG. 1C, the amplitude of the waveform v(b1) at point by (one end of MDTL 114 shown in FIG. 1B) decreases as the waveform moves to point b3 (the other end of MDTL 114 shown in FIG. 1B), as shown by waveform v(b3) taken at point b3.

FIG. 1D shows an Hspice simulation that illustrates the waveform at the end of MDTL 114 of communications system 100 where the worst attenuation of the waveform is expected. As shown in FIG. 1D, the waveform v(b3) at point b3 rises almost to its full high steady state voltage (2.1 v). This confirms that reflections from the low to the high transitions are not significant.

On the other hand, FIG. 1D shows that the low state voltage is off by 323 mv. This is a significant loss for a 1.1 v amplitude waveform. Consequently, the low threshold noise immunity has reduced from 470 mv to about 150 mv. Considering other system noise sources such as thermal, power supply, and crosstalk noise, 150 mv noise immunity may not be acceptable. Further, the high threshold noise immunity is about 332 mv, 2.2 times the low threshold noise immunity. Thus, unless communications system 100 can accept these constraints, communications system 100 can not run at 82 MHz.

Thus, in order to obtain a reasonable noise immunity, the maximum operating frequency fop must be substantially reduced which, in turn, substantially reduces the data rate, or the length of MDTL 114 must be reduced which, in turn, reduces the number of loads that can be connected to MDTL 114.

As a result, there is a need for a backplane-based communications system that provides a high data rate when the MDTL is lightly loaded without reducing the number of loads that can be connected to MDTL 114.

SUMMARY OF THE INVENTION

The present invention provides a high-speed communications system that is less expensive than terminating a SONET stream on an individual electronics card, and has, based on the position of the cards, an increased noise immunity when the backplane is lightly-loaded. The communications system of the present invention has a master electronics card that includes a first driver that outputs a first clock signal, and a second driver that outputs a framing signal. The first clock signal has a first clock period, and the framing signal has a plurality of framing periods.

The master electronics card also includes a third driver that outputs a first data signal such that a plurality of first bytes of data is output by the third driver during each framing period. Each first byte of data has bits of data that are output during different first clock periods.

The present invention also includes a method of operating a communications system that includes the steps of outputting a first clock signal and outputting a framing signal. The first clock signal has a first clock period, and the framing signal has a plurality of framing periods. In addition, the method also includes the step of outputting a first data signal such that a plurality of first bytes of data is output during each framing period. Each first byte of data has bits of data that are output during different first clock periods.

A better understanding of the features and advantages of the present invention will be obtained by reference to the following detailed description and accompanying drawings that set forth an illustrative embodiment in which the principles of the invention are utilized.

DETAILED DESCRIPTION OF THE INVENTION

As described in greater detail below, the present invention provides a high-speed, backplane transceiver logic (BTL) based communication system that has, based on the position of the cards, an increased noise immunity when the backplane is lightly-loaded. The communication system includes a master electronics card, one or more slave electronics cards, and an MDTL backplane that interconnects the master and the slave electronics cards via a serial downstream bus and a parallel TDMA upstream bus.

In the present invention, the term "downstream" refers to data coming from the network, the term "upstream" refers to data going towards the network, and the term "network" refers to the internet or similar systems that receive communications from the CPE (Customer Premises Equipment). As a result, the serial downstream bus and the parallel TDMA upstream bus define a distinct direction to traffic between the master electronics card and the one or more slave electronics cards.

Figure 2:
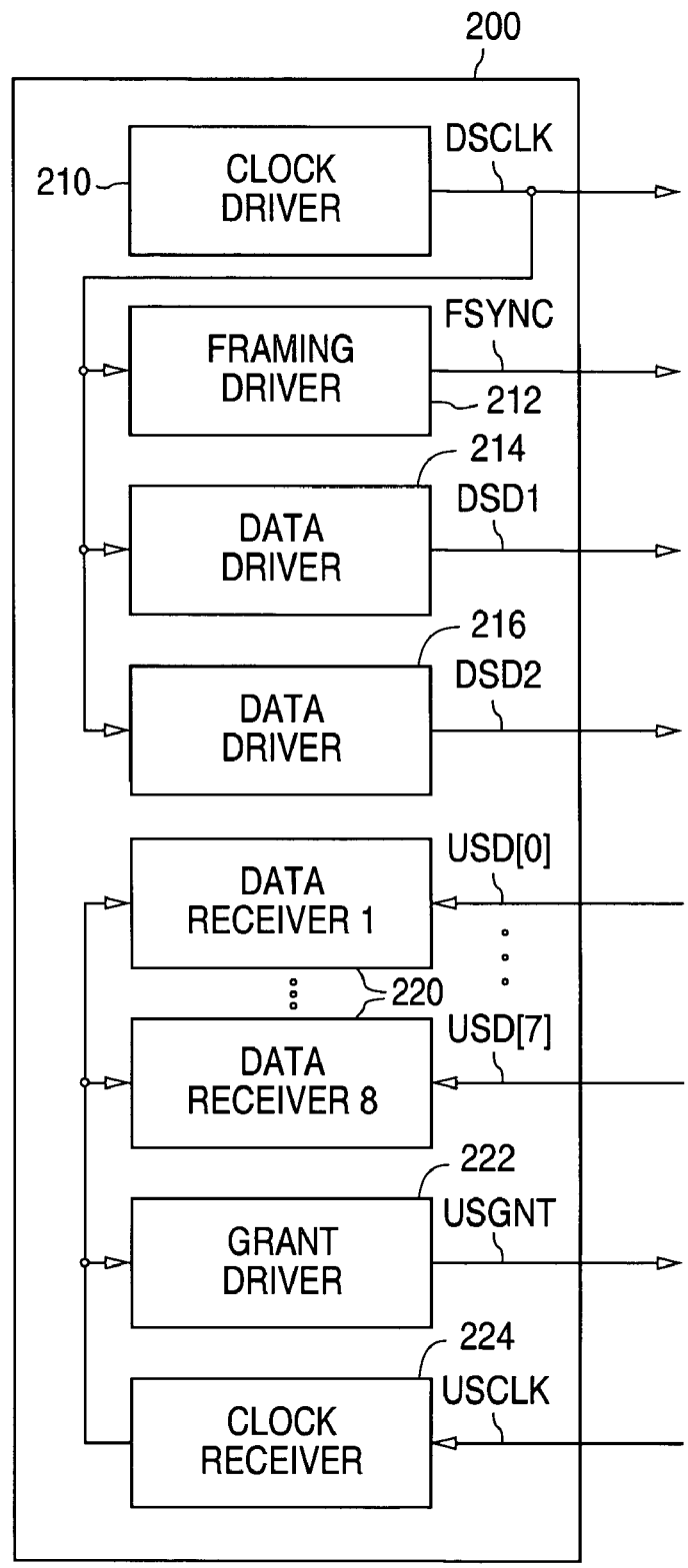
FIG. 2 is a block diagram illustrating an example of a master electronics card 200 in accordance with the present invention.

FIG. 2 shows a block diagram that illustrates an example of a master electronics card 200 in accordance with the present invention. As shown in FIG. 2, master electronics card 200, such as a CPU card, has serial downstream bus circuitry that includes a clock driver 210 that outputs a downstream clock signal DSCLK, and a framing driver 212 that outputs a framing signal FSYNC. The framing signal FSYNC has a series of framing pulses that are referenced to the downstream clock signal DSCLK.

As further shown in FIG. 2, the serial downstream bus circuitry of master electronics card 200 also includes a downstream data driver 214 that outputs a downstream data signal DSD1 such that a number of bytes of data is output by data driver 214 during each framing period. Data driver 214 serially outputs the downstream data signal DSD1 such that each byte of data has bits of data that are output during different periods of the downstream clock signal DSCLK. Data driver 214 can be implemented as, for example, an inverting backplane transceiver logic (BTL) driver.

FIGS. 3A–3F show timing diagrams that illustrate an example of the operation of master electronics card 200 in accordance with the present invention. In addition, FIGS. 4A–4D show timing diagrams that further illustrate an example of the operation of master electronics card 200 in accordance with the present invention.

As shown in FIGS. 3A–3F and 4A–4D, clock driver 210 of the serial downstream bus circuitry outputs the downstream clock signal DSCLK, which has a period T, while framing driver 212 outputs the framing signal FSYNC with a series of pulses. The series of pulses define a series of time slots, such as Time Slot 0 to Time Slot 39, where each pair of adjacent pulses defines a time slot. As further shown, downstream data driver 214 outputs the first downstream data signal DSD1.

In the present example, the downstream clock signal DSCLK is output with a frequency of 77.76 Mhz, and the framing signal FSYNC is output as a pulse that has a logic high that lasts for seven downstream clock periods, and a logic low that lasts for 212 downstream clock periods.

Further, the first downstream data signal DSD1 has 424 bits of data (b'0–b'423) that are transmitted during the 212 downstream clock periods that the framing signal FSYNC is low. The 424 bits of data equal 53 bytes which, in turn, is the required size of an ATM cell. As a result, driver 214 outputs a data signal DSD1 between framing pulses that represents one ATM cell.

As shown in FIGS. 3A–3F, downstream data driver 214 outputs the first data bit b'0 of the 424 data bits following the rising edge of the downstream clock signal DSCLK that immediately precedes the falling edge of the framing signal FSYNC. As a result, the leading edge of first data bit b'0 slightly trails the rising edge of the clock signal DSCLK, but is substantially coincident with the falling edge of the framing signal FSYNC.

In addition, downstream data driver 214 outputs the second data bit b'1 following the next falling edge of the downstream clock signal DSCLK. This sequence continues until the last data bit b'423 of the 424 bits is output following the falling edge of the downstream clock signal DSCLK that immediately precedes the rising edge of the framing signal FSYNC.

As a result, the leading edge of last data bit b'423 slightly trails the falling edge of the clock signal DSCLK, while the trailing edge of the last data bit b'423 is substantially coincident with the rising edge of the framing signal FSYNC. The rising edge of the framing signal FSYNC indicates the end of one ATM cell, while the falling edge of the framing signal FSYNC indicates the beginning of the next ATM cell.

Thus, driver 214 outputs a bit of data during each half period of the downstream clock signal DSCLK, following both the rising and falling edges of the clock signal DSCLK. As a result, since driver 214 outputs two bits during each of the 212 clock periods, and data is transferred every 212 clock periods out of every 219 clock periods (no data is transferred during the seven high clock periods of the framing pulse), driver 214 has a serial data rate of approximately 150.55 Mbps.

Included within the 424 bits of data is a header error control (HEC) that detects errors in the header of the ATM cell. Driver 214 computes the HEC for all of the to-be-transmitted ATM cells. The HEC is computed per the ATM protocol on the first four bytes of a cell, and is inserted as the fifth byte of the cell.

In addition, when there is no user data to send, data driver 214 outputs idle data that includes a number of idle cells. An idle cell can include, for example, all zeros. Further, an idle cell has a virtual path indicator (VPI) and a virtual connection indicator (VCI) that are both set to zero. As a result, an idle cell passes through an inverting BTL driver as a high logic level, which is the off state or low power state for an inverting BTL driver.

Returning to FIG. 2, the serial downstream bus circuitry of master electronics card 200 can also include a downstream data driver 216 that outputs a second downstream data signal DSD2. Downstream data driver 216 outputs the second downstream data signal DSD2, which represents different data than the first downstream data signal DSD1, following the same protocol that data driver 214 follows to output the first downstream data signal DSD1.

Further, the serial downstream bus circuitry of master electronics card 200 can have more than two data drivers to output additional downstream data signals in the same way that the first and second downstream data signals DSD1 and DSD2 are output. For example, master electronics card 200 can have 16 drivers that simultaneously output 16 different serial downstream data signals between a pair of framing pulses that represent 16 different ATM cells.

As additionally shown in FIG. 2, master electronics card 200 also has parallel upstream bus circuitry that includes a number of data receivers 220, such as eight, that receive a corresponding number of upstream data signals USD, such as USD[7:0], so that a number of bytes of data is received during each framing period. The data receivers 220 receive the upstream data signals USD in parallel such that each byte of data has bits of data that are all received during the same period of the downstream clock signal DSCLK.

Figure 3:
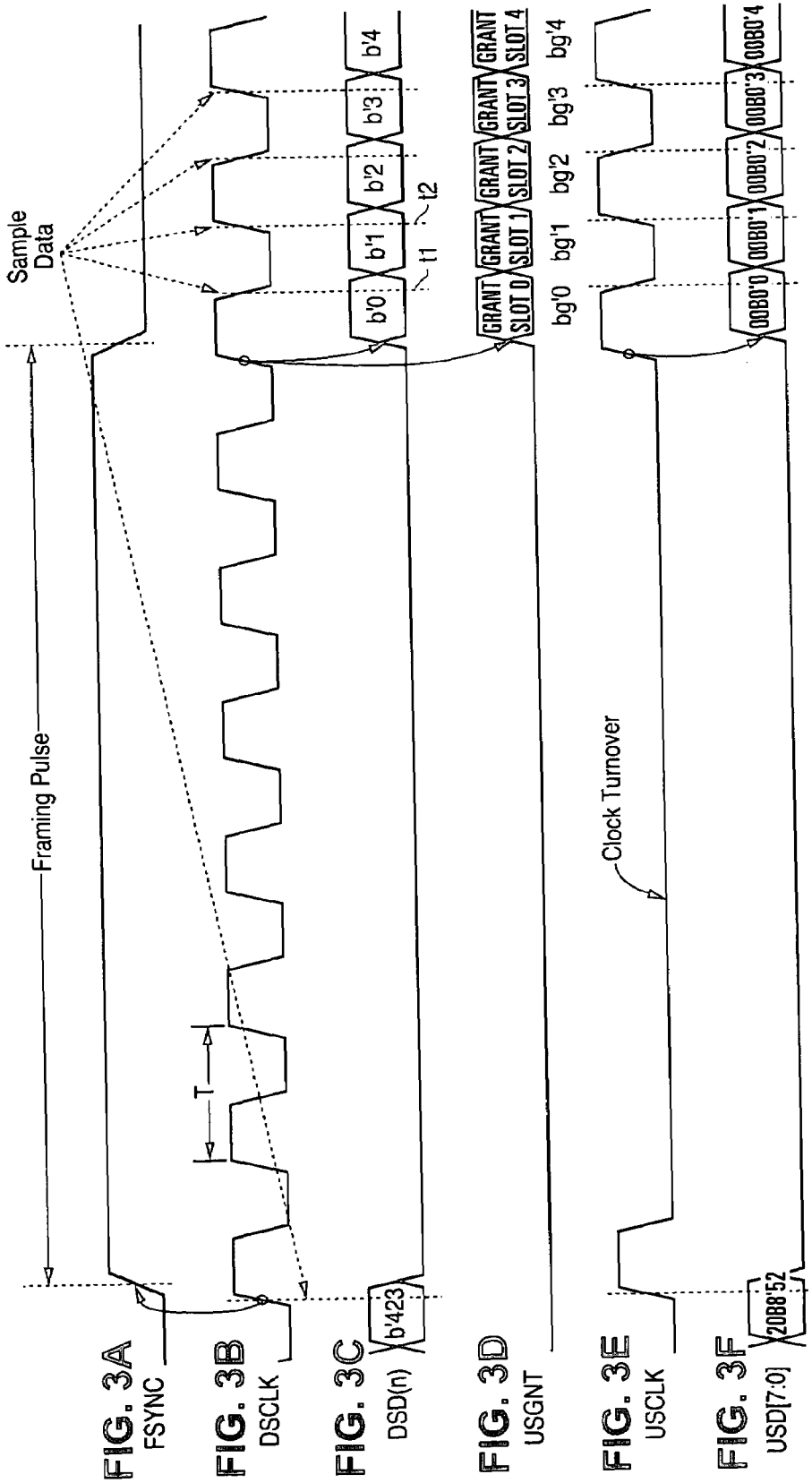
FIGS. 3A–3F are timing diagrams illustrating an example of the operation of master electronics card 200 and slave electronics card 500 in accordance with the present invention.

Further, the parallel upstream bus circuitry of master electronics card 200 includes a grant driver 222 that outputs a bus grant signal USGNT during each framing period. As shown in FIG. 3D, the bus grant signal USGNT includes a number of bits of grant data bg'0–bg'n, such as 32 bits, that are output following each falling edge of the framing pulse FSYNCH. Each bit of grant data, in turn, corresponds with a slave card. In addition, only one bit of the grant data has a logic high during each framing period.

Thus, when the first grant bit bg'0 corresponds with a first slave card (connected to slot 0 on a backplane), the first slave card is granted control of a bus by grant driver 222 for the next framing period by outputting the first grant bit bg'0 as a logic high and the remaining grant bits bg'1–bg'n as logic lows during the current framing period.

Similarly, when the second grant bit bg'1 corresponds with a second slave card (connected to slot 1 on a backplane), the second slave card is granted control of the bus during the next framing period by outputting the first grant bit bg'0 as a logic low, the second grant bit bg'1 as a logic high, and the remaining grant bits bg'2–bg'n as logic lows during the current framing period.

Figure 4:
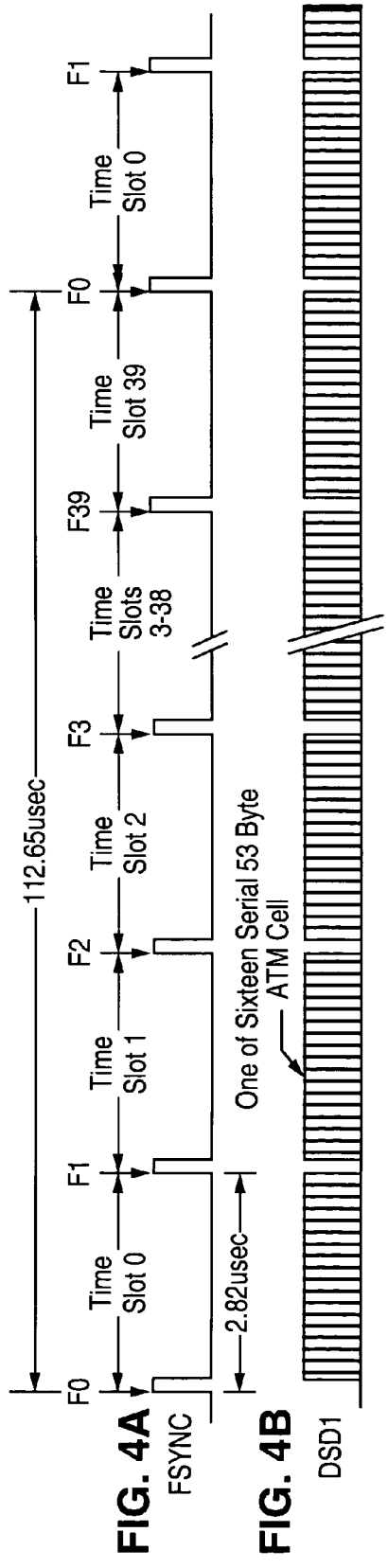
FIGS. 4A–4D are timing diagrams that further illustrate an example of the operation of master electronics card 200 and slave electronics card 500 in accordance with the present invention.

In addition, as shown in FIG. 4A, grant driver 222 grants the bus in cycles of forty framing periods (Time Slot 0 to Time Slot 39). During this forty-frame cycle, grant driver 222 can grant the bus to a single slave card forty times or zero times. One advantage of using forty frame cycles is that it allows grant driver 222 to grant a single slave card up to half the bandwidth while still being able to give the other slave cards at least a minimal amount of bandwidth. Further, grant driver 222 can grant the bus to the slave cards in any order. Grant driver 222 can also not grant the bus and leave it idle.

Returning to FIG. 2, the parallel upstream bus circuitry of master electronics card 200 also includes a clock receiver 224 that receives an upstream clock signal USCLK that is substantially synchronized with the downstream clock signal DSCLK. In the present example, the data receivers 220 utilize the upstream clock signal USCLK to clock the incoming upstream data signals USD.

However, since the upstream clock signal USCLK is substantially synchronized with the downstream clock signal DSCLK, the bits of each byte of data of the upstream data signals USD are all received during the same period of the downstream clock signal DSCLK. In the present example, the downstream bus circuitry and the upstream bus circuitry on master electronics card 200 can be implemented in an application specific integrated circuit (ASIC).

Figure 5:
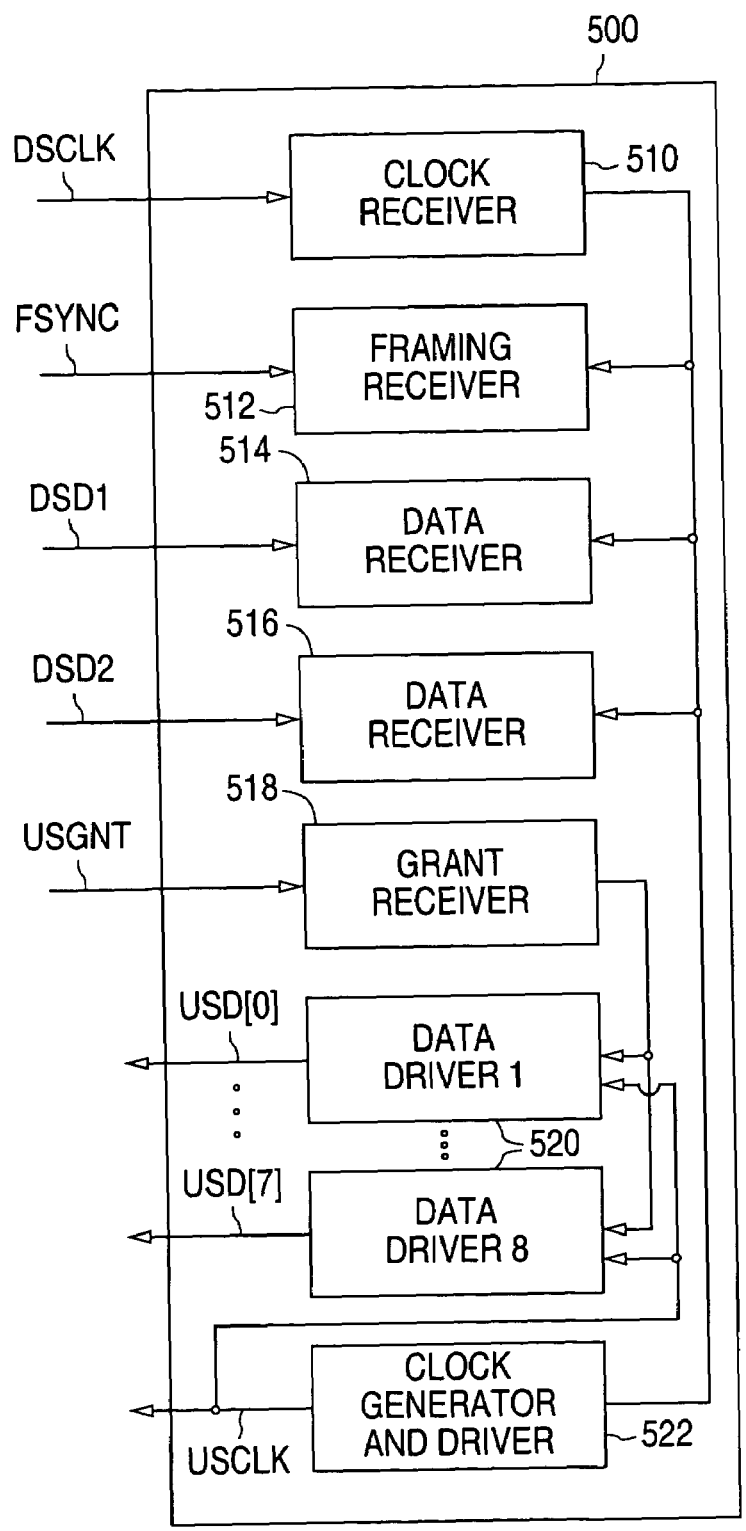
FIG. 5 is a block diagram illustrating an example of a slave electronics card 500 in accordance with the present invention.

FIG. 5 shows a block diagram that illustrates an example of a slave electronics card 500 in accordance with the present invention. As shown in FIG. 5, slave electronics card 500, such as an xDSL card that has a DSL access module (DSLAM), has downstream bus circuitry that includes a clock receiver 510 and a framing receiver 512. Clock receiver 510 receives the downstream clock signal DSCLK, such as from clock driver 210, while framing receiver 512 receives the framing signal FSYNC, such as from framing driver 212.

The downstream bus circuitry of slave electronics card 500 also includes a downstream data receiver 514 that receives the downstream data signal DSD1 from a data driver, such as from data driver 214, determines if the bytes of data output during a framing period by the data driver, such as data driver 214, is addressed to slave card 500, passes the downstream data signal DSD1 when addressed to slave card 500, and discards the downstream data signal DSD1 when not addressed to slave card 500.

FIGS. 3A–3F and 4A–4D also illustrate an example of the operation of slave electronics card 500 in accordance with the present invention. As shown in FIGS. 3A–3F and 4A–4D, when data driver 214 outputs the first data bit b'0 following the rising edge of the downstream clock signal DSCLK, data receiver 514 samples the first data bit b'0 at time t1 on the following falling edge of the downstream clock signal DSCLK.

Similarly, when data driver 214 outputs the second data bit b'1 in response to the falling edge of the downstream clock signal DSCLK, data receiver 514 samples the second bit b'1 at time t2 on the following rising edge of the clock signal DSCLK. This sequence continues until the last data bit (bit 0 of byte 52) has been sampled.

When downstream data receiver 514 receives a data stream, receiver 514 checks the received HEC. All ATM cells that fail the check are discarded (unless ignore HEC is enabled). In addition, receiver 514 inverts the data from the BTL drivers. This allows data on the master and slave electronics cards 200 and 500 to be described in the same context. Data output from master electronics card 200 can be positive logic such that a logic high equals one and a logic low equals zero.

Further, receiver 514 discards all ATM cells where the VPI/VCI is set to zero. The HEC should not be checked on these cells. Receiver 514 also discards all received ATM cells that have fewer than 424 bits of data. This helps filter out ATM cells that are corrupted by bus noise. Receiver 514 can use the framing pulse and a clock counter to determine if less than the required number of bits has been transferred.

Referring again to FIG. 5, the downstream bus circuitry of slave electronics card 500 can also include a downstream data receiver 516 that receives the second downstream data signal DSD2, such as from data driver 216. Downstream data receiver 516 receives the second downstream data signal DSD2 following the same protocol that data receiver 514 follows to receive the first downstream data signal DSD1, i.e., receiver 516 passes the downstream data signal DSD2 when addressed to slave card 500, and discards the downstream data signal DSD2 when not addressed to slave card 500.

Further, the downstream bus circuitry of slave electronics card 500 can have more than two data receivers to receive additional downstream data signals in the same way that the first and second downstream data signals DSD1 and DSD2 are received. For example, slave electronics card 500 can have 16 data receivers that simultaneously receive 16 different downstream data signals between a pair of framing pulses that represent 16 different ATM cells.

As additionally shown in FIG. 5, slave electronics card 500 has upstream bus circuitry that includes a grant receiver 518. Grant receiver 518 receives the grant signal USGNT, such as from grant driver 222, and determines if slave card 500 has been granted permission to transmit during the next framing period by determining whether the logic state of the grant bit that corresponds with slave card 500 has a logic high.

As additionally shown in FIG. 5, the upstream bus circuitry of slave electronics card 500 includes a number of data drivers 520, such as eight, that output a corresponding number of upstream data signals USD, such as USD[7:0], so that a number of bytes of data is output during a framing period when slave card 500 has permission to transmit. The data drivers 520 output the upstream data signals USD in parallel such that each byte of data has bits of data that are all output during the same period of the downstream clock signal DSCLK.

Further, the upstream bus circuitry of slave electronics card 500 includes a clock generator and driver 522 that generates and outputs the upstream clock signal USCLK. Clock generator and driver 522, which includes a phase-locked-loop (PLL) and a clock divider, outputs the upstream clock signal USCLK by utilizing the PLL to generate a 155.52 MHz clock signal that is locked to the downstream clock signal DSCLK. The 155.52 MHz clock signal is then divided down by the clock divider to form a 77.76 MHz upstream clock signal USCLK.

On the seventh rising edge of the downstream clock signal DSCLK after the framing signal FSYNC has been asserted, the data drivers 520 of slave electronics card 500 drives the first data byte of the first cell and starts driving the upstream clock signal USCLK when slave electronics card 500 has permission to transmit. The data drivers 520 of slave card 500 drives new data on every edge of the upstream clock signal USCLK for the next 212 clocks.

Clock generator and driver 522 drives 213 clock pulses. The extra clock allows the receiving device to clear out a single pipeline stage. (A slave does not have to drive data or clock onto the bus when it receives a grant.) As a result, data drivers 520 can drive up to 8 ATM cells on the bus during a framing period (8 lines wide by one ATM cell long).

If slave electronics card 500 is granted the bus and it has no data to transmit, it must send the upstream clock signal USCLK with idle cells. As noted above, an idle cell is a cell with the contents equal to zero, and a VPI/VCI set to zero. If slave electronics card 500 is not granted the bus, it must drive zero on its upstream clock and data lines.

In addition, the data drivers 520 on slave electronics card 500 compute the HEC for all ATM cells sent on the bus. The HEC is computed per the ATM protocol on the first four bytes of an ATM cell, and is inserted as the fifth byte of the ATM cell. The data receivers 220 on master card 200 check the received HEC. All ATM cells that fail the check should be discarded. In addition, the data receivers 220 discard all ATM cells with the VPI/VCI set to zero. The HEC should not be checked on these cells.

Further, if slave electronics card 500 is granted the bus for two consecutive framing periods, slave electronics card 500 must set the upstream clock signal USCLK and the upstream data signal USD to zero during the framing period (when the framing pulse is high). This allows the clock and data to look identical for frames that switch slaves and frames that do not switch slaves.

Slave electronics card 500 may send any combination of idle cells or data cells for the eight cells it can send during a framing period. If slave electronics card 500 sends an idle cell followed by a data cell, the data cell must start at a cell boundary. A cell boundary occurs every 53 clock edges (rising or falling) of the framing period.

In the present example, the downstream bus circuitry and the upstream bus circuitry of slave electronics card 500 can also be implemented in the application specific integrated circuit (ASIC). Further, the downstream bus circuitry and the upstream bus circuitry of both master electronics card 200 and slave electronics card 500 can be implemented in a single ASIC which is then configured to function as a master or a slave.

Figure 6:
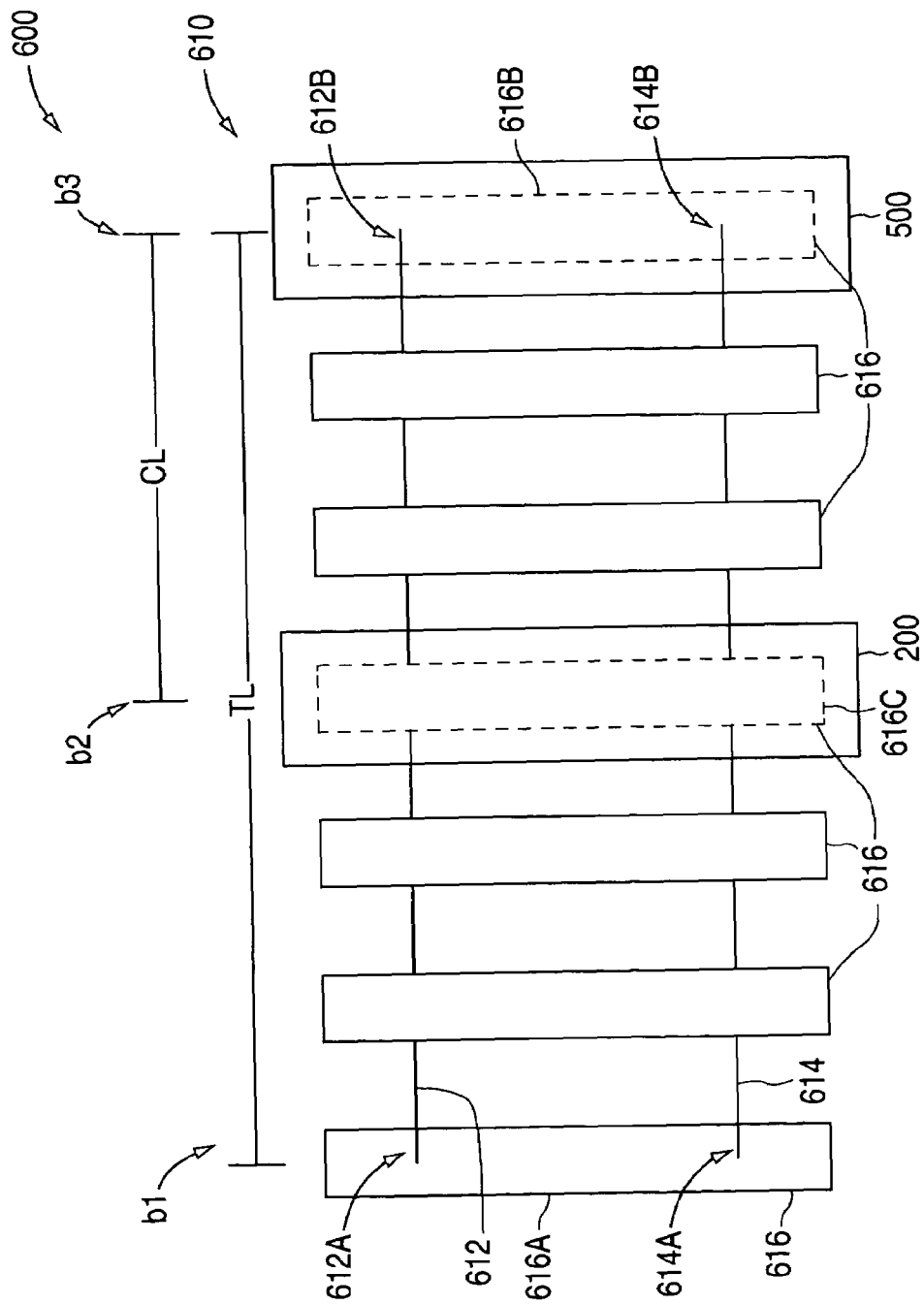
FIG. 6 is a plan view illustrating an example of a communications system 600 in accordance with the present invention.

FIG. 6 shows a perspective view that illustrates an example of a communications system 600 in accordance with the present invention. As shown in FIG. 6, communications system 600 includes master electronics card 200, a number of slave electronics cards 500 (up to 20 slave electronics cards 500 in the present example), and an MDTL backplane 610 that is connected to master electronics card 200 and the slave electronics cards 500.

Backplane 610 has downstream bus circuitry that includes a first MDTL 612 that represents a number of first metal lines that carry the downstream clock signal DSCLK, the framing signal FSYNC, and the downstream data signals, such as downstream data signal DSD1, from the master electronics card 200 to the slave electronics cards 500. First MDTL 612 has a first end 612A and an opposing second end 612B.

In addition, backplane 610 also has upstream bus circuitry that includes a second MDTL 614 that represents a number of second metal lines that carry the grant signal USGNT, the upstream clock signal USCLK, and the upstream data signals USD from the slave electronics cards 500 to master card 200. Second MDTL 614 has a first end 614A and an opposing second end 614B.

In the present invention, a point-to-multipoint high-speed serial (HSS) bus is defined by the downstream bus circuitry on master electronics card 200, first MDTL 612 on backplane 610, and the downstream bus circuitry on the slave cards 500. In the present example, the HSS bus utilizes 16 serial data lines that carry 16 downstream data signals, a framing line that carries the framing signal FSYNC, and a downstream clock line that carries the downstream clock signal DSCLK. Each of the 16 serial data lines operates at a data bandwidth of more than 150 Mbps.

In operation, master electronics card 200 outputs to each slave card 500 (as a serial broadcast) a downstream clock signal DSCLK on the downstream clock line of MDTL 612, a framing signal FSYNC on the framing line of MDTL 612, and the downstream data signals DSD on the downstream data lines of MDTL 612. Each slave electronics card 500 determines if a downstream data signal is addressed to it, passes the signal when the address matches, and discards the signal when the address does not match.

Although each slave electronics card 500 can be connected to all 16 downstream data lines, slave electronics card 500 can monitor a smaller number of data lines. In the present example, the downstream data line(s) monitored by each slave card 500 is less than 16, and statically configured.

As a result, the downstream data drivers on master electronics card 200 must send all data traffic intended for a specified slave card 500 on a specified serial downstream data line. One advantage of this configuration is that this configuration allows for the design of relatively inexpensive high bandwidth master cards, such as an OC-12 or OC-48 network card. These cards can send from 602 Mbps to 2.408 Gbps on the HSS bus.

It also allows for the design of relatively inexpensive xDSL line cards. These cards will be capable of delivering at a minimum of 150 Mbps to their application layer. Master electronics card 200 does not necessarily have to drive all sixteen serial data lines. But, no matter how many lines are driven, only one master electronics card 200 can be active at one time.

In addition, a multipoint-to-point fast-access multiplexed (FAM) bus is defined by the upstream bus circuitry on the slave electronics cards 500, second MDTL 614 on backplane 610, and the upstream bus circuitry on master electronics card 200. In the present example, the FAM bus utilizes eight parallel data lines that carry the upstream data signals, a bus grant line that carries the bus grant signal USGNT, and an upstream clock line that carries the upstream clock signal USCLK. The FAM bus runs at exactly the same frequency as the HSS bus, and provides a data rate of approximately 1.204 Gbps. Master electronics card 200 is the bus master for both the HSS and FAM busses.

In operation, grant driver 222 of master electronics card 200 outputs the grant signal USGNT on the grant line of second MDTL 614 to the slave cards 500 during each framing period. Since grant driver 222, which functions as the FAM bus master, grants the bus at preset intervals (the first 32 bits following the falling edge of each framing signal FSYNC), the FAM bus functions as a Time Division Multiplexed Access (TDMA) bus. With a TDMA bus, it does not matter if a slave electronics card 500 has data or not. If the slave electronics card 500 does not have data, it simply places an idle cell on the FAM bus.

A slave electronics card 500 takes control of the FAM bus by first monitoring the grant signal USGNT on the grant line, which has the same timing as the HSS-bus data lines. As noted above, the first 32 bits of data sent down the grant line after a framing pulse identify one of the slave electronics cards 500 that is connected to backplane 610. When a slave electronics card 500 detects the grant signal USGNT, the slave electronics card 500 determines if the grant signal USGNT has granted it the FAM bus. The identified slave card 500, in turn, is granted the FAM bus for the following frame.

Once a slave electronics card 500 has been granted the FAM bus, the data drivers 520 of the slave card 500 drive an upstream clock signal USCLK and an upstream data signal USD onto the FAM bus during the next framing period, and transfer from zero to eight cells to the master electronics card.

One of the advantages of the present invention is that the serial HSS bus and the parallel TDMA FAM bus provide the ability to speed up data transmission by sending clock and data in only one direction, and using both edges of the high-speed clock to clock in data. This eliminates the need for data to settle-out (de-propagate) as on a conventional bi-directional bus architecture, like a variety of central synchronous bus architectures (e.g. VME, PCI and ISA buses). As a result, the present invention provides a low-cost, high-speed, backplane-based communication system that does not require the high cost of a SONET bus termination.

As further shown in FIG. 6, backplane 610 has a number of connectors 616 that are connected to first MDTL 612 and second MDTL 614. The connectors 616 include a first connector 616A that lies adjacent to the first ends 612A and 614A of the first and second lines 612 and 614, and a second connector 616B that lies adjacent to the second ends 612B and 614B of the first and second lines 612 and 614.

In addition, in accordance with the present invention, a master connector 616C that receives master card 200 is positioned so that the first connector 616A lies between the master connector 616C and the first ends 612A and 614A, and the second connector 616B lies between the master connector 616C and the second ends 612B and 614B.

Preferably, master connector 616C lies at the electrical center between the first and second connectors 616A and 616B. By positioning master card 200 approximately in the center of MDTLs 612 and 614, the reflections resulting from the waveform's high to low transition only traverse half the MDTL length, thereby reducing the reflection waveform period by half.

Figure 1A:
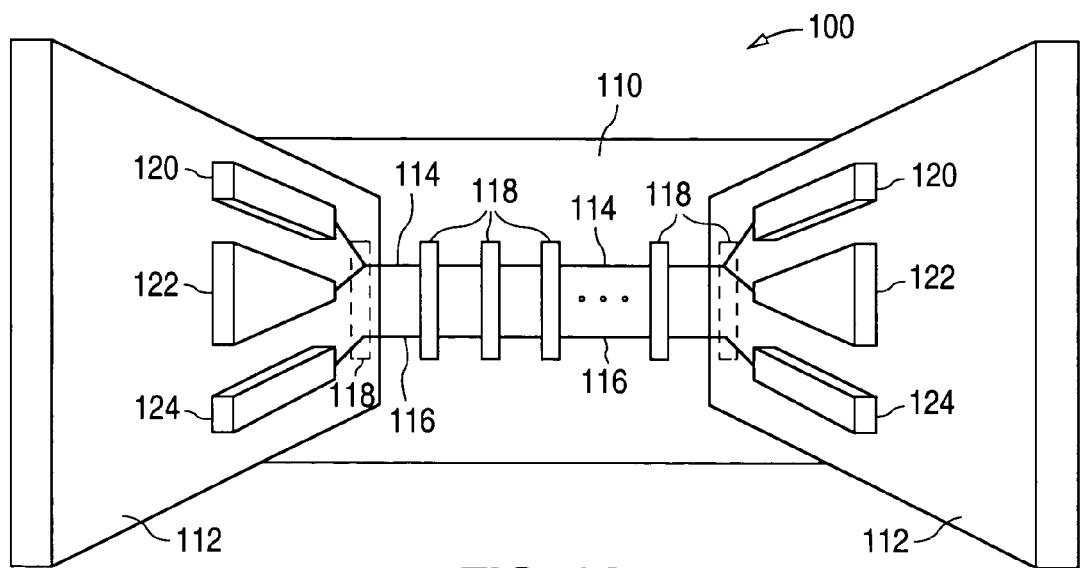
FIG. 1A is a perspective view illustrating a prior-art, backplane-based communications system 100.
Figure 1B:
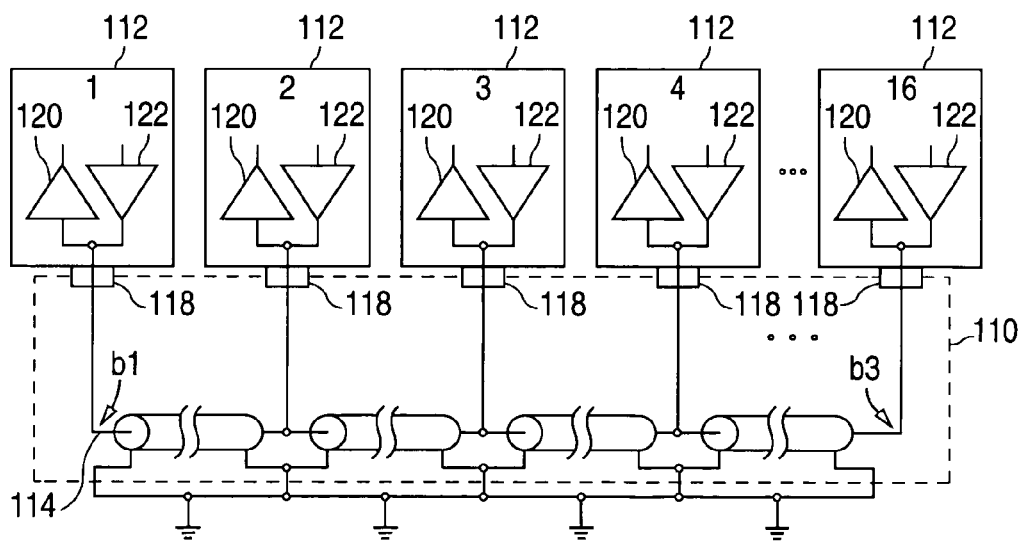
FIG. 1B is a schematic diagram illustrating a portion of communications system 100.
Figure 1C:
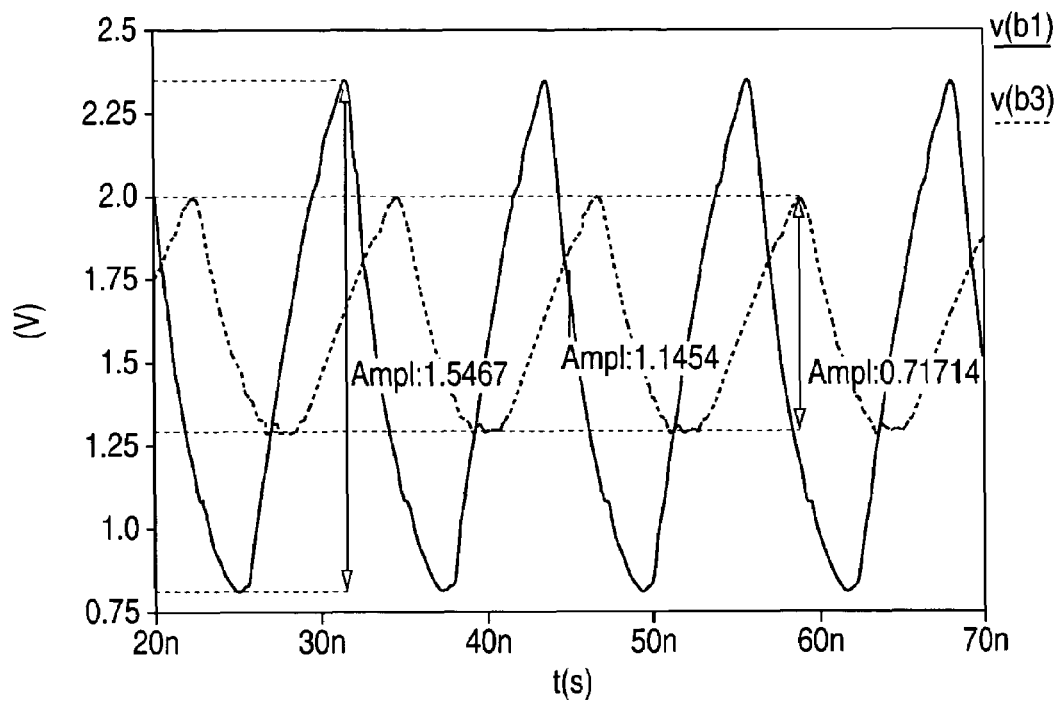
FIG. 1C is an Hspice simulation of communications system 100 illustrating the waveform along the length of MDTL 114.
Figure 1D:
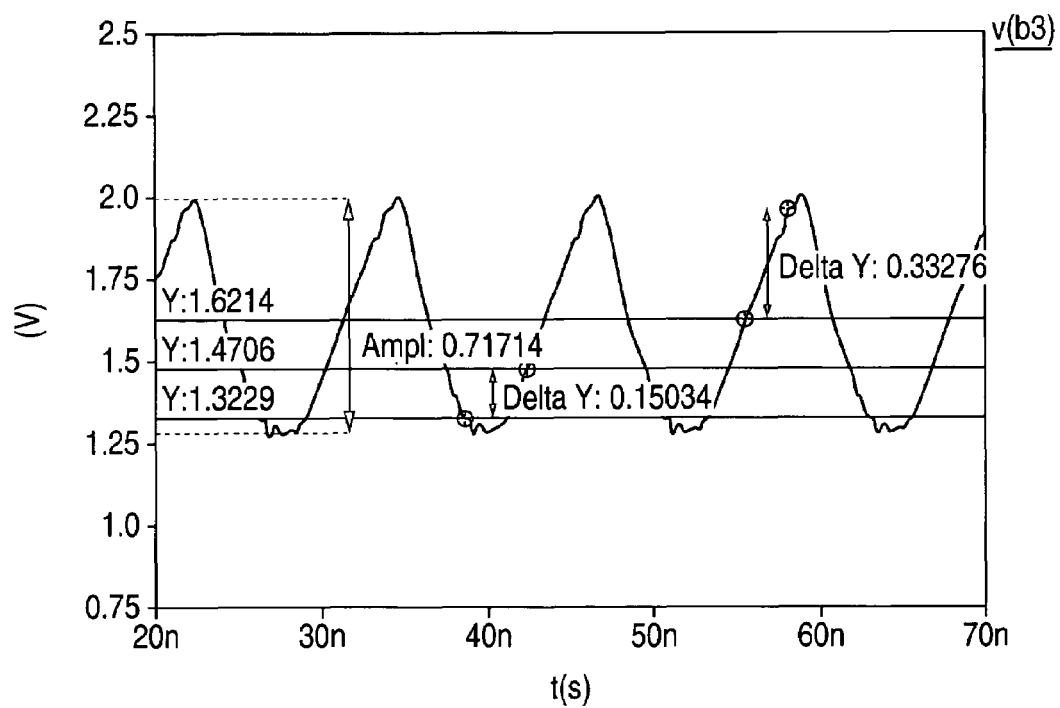
FIG. 1D is an Hspice simulation illustrating the waveform at the end of MDTL 114 of communications system 100 where the worst attenuation of the waveform is expected.
Figure 7:
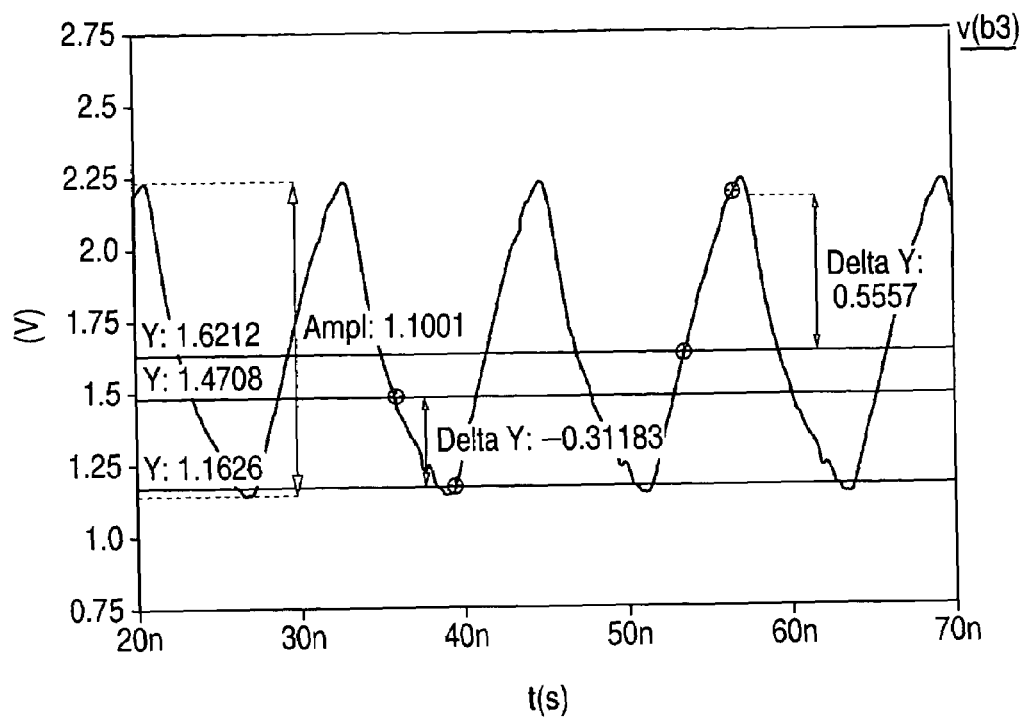
FIG. 7 is an Hspice simulation of the waveform v(b3) of communications system 600 at point b3 when driving approximately from the center of the MDTLs 612 and 614 in accordance with the present invention.

FIG. 7 shows an Hspice simulation of the waveform v(b3) of communications system 600 at point b3 when driving approximately from the center of the MDTLs 612 and 614 in accordance with the present invention. The simulation assumes a total transmission line length TL of (17 inches), a center transmission line length CL of 22.86 cm (nine inches), an operating frequency of 82 MHz, 2 loads, a transmission line characteristic impedance Zo of 60 Ω, a transmission line characteristic impedance Zo' of 27 Ω, a propagation delay τpd of 180 pS/2.54 cm (180 pS/inch), a propagation delay τpd' of 400 pS/2.54 cm (400 pS/inch), a termination line impedance Zt of 27 Ω, and a source impedance Zs of 27 Ω. As shown in FIG. 7, the low threshold noise immunity is about 300 mv. This is twice the noise immunity than when driving from the end of the MDTL as shown in FIG. 1D.

Figure 8:
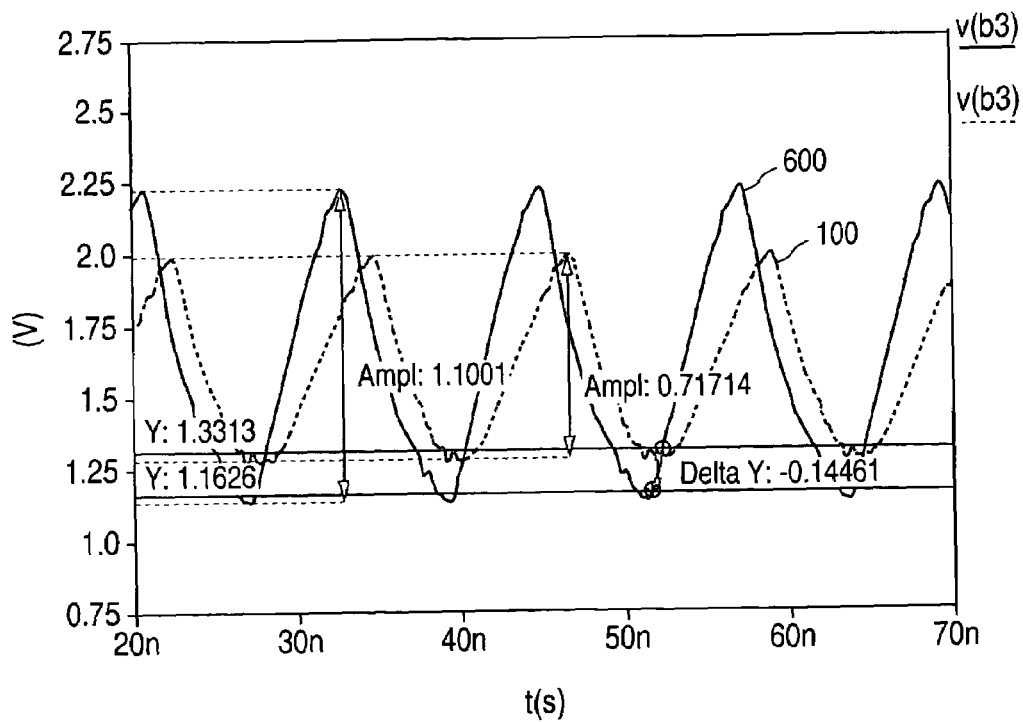
FIG. 8 is an Hspice simulation that compares the waveform v(b3) of communications systems 100 at point b3 when driven from one end of MDTL 114, and the waveform v(b3) of communications systems 600 at point b3 when driven from approximately the center of MDTL 612 in accordance with the present invention.

FIG. 8 shows an Hspice simulation that compares the waveform v(b3) of communications systems 100 at point b3 when driven from one end of MDTL 114, and the waveform v(b3) of communications systems 600 at point b3 when driven from approximately the center of MDTL 612 in accordance with the present invention. As shown in FIG. 8, the gain in the low threshold noise immunity is roughly 145 mv.

Thus, in accordance with the present invention, when only two electronics cards are present (a lightly-loaded condition), an MDTL has a minimum noise immunity when driven by a card at one end to the other card at the other end, and a maximum noise immunity when driven by a card at the electrical center of the MDTL to the other card at the other end.

As a result, for a given length of transmission line and maximum operating frequency fop, a 50% or greater increase in noise immunity can be obtained by positioning the master electronics card so that the noise immunity is equal to or greater than (Max Immunity-Min Immunity/2)+ Minimum Immunity. Lesser increases in noise immunity can also be obtained by positioning the master electronics card between the electrical center and the ends.

As physical slot loads are added to MDTLs 612 and 614, the transmission line characteristic impedance Zo' approaches the termination line impedance Zt which, in turn, reduces the magnitude of the reflection. Eventually, when MDTLs 612 and 614 are fully loaded, the transmission line impedance Zo, matches the termination line impedance Zt. In this case, the reflections, and therefore the standing wave phenomenon, disappear.

Although 16 loads were used in the above examples, the analysis applies to open collector-based MDTLs with different numbers of loads, such as 20. This is because the length of the MDTL remains the same (e.g., 17 inches), and the transmission line system behaves similarly under light loading conditions. The difference, however, is reflected in the calculated value of the transmission line characteristic impedance Zo' and the propagation delay τpd' under full loading. The value of the termination line impedance Zt should also change to match the transmission line impedance Zo'.

It should be understood that the above descriptions are examples of the present invention, and that various alternatives of the invention described herein may be employed in practicing the invention. Thus, it is intended that the following claims define the scope of the invention and that structures and methods within the scope of these claims and their equivalents be covered thereby.

What is claimed is:

1. A communications system comprising a master electronics card, the master electronics card including:
   a first driver that outputs a first clock signal, the first clock signal having a first clock period;
   a second driver that outputs a framing signal, the framing signal having a plurality of framing periods, and
   a third driver that outputs a first data signal such that a plurality of first bytes of data is output by the third driver during each framing period, each first byte of data having bits of data that are output during different first clock periods.

2. The communications system of claim 1 wherein the master electronics card further includes a plurality of data receivers that receive a plurality of second data signals such that a plurality of second bytes of data is received during each framing period, each second byte of data having bits of data that are all received during a same first clock period.

3. The communications system of claim 2 wherein the master electronics card further includes a fourth driver that outputs a third data signal such that a plurality of third bytes of data is output by the fourth driver during each framing period, each third byte of data having bits of data that are output during different first clock periods.

4. The communications system of claim 3 wherein the plurality of first bytes of data and the plurality of third bytes of data are different.

5. The communications system of claim 3 wherein, during one first clock period that has a rising edge and a falling edge, the third driver outputs a bit of data during the rising edge and a bit of data during the falling edge.

6. The communications system of claim 3 wherein the master electronics card further includes a fifth driver that outputs a bus grant signal such that, during one first clock period that has a rising edge and a falling edge, the logic state of the bus grant signal at the rising edge determines whether a first device may transmit during a subsequent framing period, and the logic state of the bus grant signal at the falling edge determines whether a second device may transmit during the subsequent framing period, only one device may transmit during the subsequent framing period.

7. The communications system of claim 6 wherein the master electronics card includes a clock receiver that receives a second clock signal, the first clock signal and the second clock signal being substantially equal.

8. The communications system of claim 2 and further comprising a slave electronics card, the slave electronics card having:
   a first receiver that receives the first clock signal from the first driver;
   a second receiver that receives the framing signal from the second driver, and
   a third receiver that receives the first data signal from the third driver, determines if a plurality of first bytes of data output by the third driver during a framing period is addressed to the slave electronics card, passes the first data signal when addressed to the slave electronics card, and discards the first data signal when not addressed to the slave electronics card.

9. The communications system of claim 3 and further comprising a first slave electronics card, the first slave electronics card having:
   a first receiver that receives the first clock signal from the first driver;
   a second receiver that receives the framing signal from the second driver,
   a third receiver that receives the first data signal from the third driver, determines if a plurality of first bytes of data output by the third driver during a framing period is addressed to the first slave electronics card, passes the first data signal when addressed to the first slave electronics card, and discards the first data signal when not addressed to the first slave electronics card; and
   a fourth receiver that receives the third data signal from the fourth driver, determines if a plurality of third bytes of data output by the fourth driver during a framing period is addressed to the first electronics slave card, passes the third data signal when addressed to the first slave electronics card, and discards the third data signal when not addressed to the first slave electronics card.

10. The communications system of claim 9 wherein the first slave electronics card further has a first grant receiver that receives a grant signal from the master electronics card, and determines if the first slave electronics card has been granted permission to transmit during the next framing period.

11. The communications system of claim 10 wherein the first slave electronics card further has a plurality of first data drivers that output second data signals to the plurality of data receivers when the first slave electronics card has permission to transmit.

12. The communications system of claim 11 and further comprising a second slave electronics card, the second slave electronics card having:
   a fifth receiver that receives the first clock signal from the first driver;
   a sixth receiver that receives the framing signal from the second driver;
   a seventh receiver that receives the first data signal from the third driver, determines if a plurality of first bytes of data output by the third driver during a framing period is addressed to the second slave electronics card, passes the first data signal when addressed to the second slave electronics card, and discards the first data signal when not addressed to the second slave electronics card; and
   an eighth receiver that receives the third data signal from the fourth driver, determines if a plurality of third bytes of data output by the fourth driver during a framing period is addressed to the second electronics slave card, passes the third data signal when addressed to the second slave electronics card, and discards the third data signal when not addressed to the second slave electronics card.

13. The communications system of claim 12 wherein the second slave electronics card further has a second grant receiver that receives the grant signal from the master electronics card, and determines if the second slave electronics card has been granted permission to transmit during the next framing period.

14. The communications system of claim 13 wherein the second slave electronics card further has a plurality of second data drivers that output second data signals to the plurality of data receivers when the second slave electronics card has permission to transmit.

15. The communications system of claim 8 and further comprising a second slave electronics card, the second slave electronics card having:
   a fourth receiver that receives the first clock signal from the first driver;

a fifth receiver that receives the framing signal from the second driver, and a sixth receiver that receives the first data signal from the third driver, determines if a plurality of first bytes of data output by the third driver during a framing period is addressed to the second slave electronics card, passes the first data signal when addressed to the second slave electronics card, and discards the first data signal when not addressed to the second slave electronics card.

16. The communications system of claim 15 and further comprising a backplane, the backplane having:

a plurality of first lines that carry the first clock signal, the framing signal, and the first data signal, the plurality of first lines having a first end and an opposing second end;

a plurality of second lines the carry the plurality of second data signals, the plurality of second lines having a first end and an opposing second end; and a plurality of connectors connected to the plurality of first lines and the plurality of second lines, the plurality of connectors including a first connector that lies adjacent to the first ends of the first and second lines, a second connector that lies adjacent to the second ends of the first and second lines, and a third connector that lies between the first and second connectors, the master electronics card being connected to the third connector.

17. The communications system of claim 16 wherein the third connector is located at an electrical center between the first and second connectors.

18. The communications system of claim 16 wherein the third connector is positioned with respect to the first and second connectors such that a noise immunity is equal to or greater than (a maximum noise immunity−a minimum noise immunity/2)+the minimum noise immunity.

19. A method of operating a communications system comprising the steps of:

outputting a first clock signal, the first clock signal having a first clock period;

outputting a framing signal, the framing signal having a plurality of framing periods, and outputting a first data signal such that a plurality of first bytes of data is output during each framing period, each first byte of data having bits of data that are output during different first clock periods.

20. The method of claim 1 and further comprising the step of receiving a plurality of second data signals such that a plurality of second bytes of data is received during each framing period, each second byte of data having bits of data that are all received during a same first clock period.

* * * * *

UNITED STATES PATENT AND TRADEMARK OFFICE
CERTIFICATE OF CORRECTION

| | |
|---|---|
| PATENT NO. | : 7,065,593 B2 |
| APPLICATION NO. | : 10/738283 |
| DATED | : June 20, 2006 |
| INVENTOR(S) | : Ripy et al. |

It is certified that error appears in the above-identified patent and that said Letters Patent is hereby corrected as shown below:

<u>Column 1,</u>

Line 17, delete "XDSL" and replace with --xDSL--.

<u>Column 5,</u>

Line 34, delete "by" and replace with --b1--.

<u>Column 18,</u>

Line 20, delete "1" and replace with --19--.

Signed and Sealed this

Twenty-second Day of August, 2006

JON W. DUDAS
*Director of the United States Patent and Trademark Office*